(12) United States Patent
Plummer

(10) Patent No.: US 8,607,163 B2
(45) Date of Patent: Dec. 10, 2013

(54) PREVIEW MODE FOR CONTENT

(75) Inventor: Michael J. Plummer, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 1138 days.

(21) Appl. No.: 11/916,557

(22) PCT Filed: Jun. 7, 2006

(86) PCT No.: PCT/IB2006/051810
§ 371 (c)(1),
(2), (4) Date: Dec. 5, 2007

(87) PCT Pub. No.: WO2006/131887
PCT Pub. Date: Dec. 14, 2006

(65) Prior Publication Data
US 2008/0216020 A1 Sep. 4, 2008

(30) Foreign Application Priority Data
Jun. 9, 2005 (EP) .................................. 05105095

(51) Int. Cl.
*G06F 3/048* (2013.01)

(52) U.S. Cl.
USPC ............................. 715/825; 715/845; 715/841

(58) Field of Classification Search
USPC .................... 715/700–867, 961–978
See application file for complete search history.

(56) References Cited

U.S. PATENT DOCUMENTS

| | | | |
|---|---|---|---|
| 5,408,449 A | 4/1995 | Oh | |
| 5,760,776 A * | 6/1998 | McGurrin et al. | 715/841 |
| 6,179,487 B1 * | 1/2001 | Bardon et al. | 715/841 |
| 6,199,082 B1 * | 3/2001 | Ferrel et al. | 715/205 |
| 6,348,932 B1 * | 2/2002 | Nishikawa et al. | 715/719 |
| 6,357,042 B2 * | 3/2002 | Srinivasan et al. | 725/32 |
| 6,544,040 B1 * | 4/2003 | Brelis et al. | 434/236 |
| 6,583,800 B1 * | 6/2003 | Ridgley et al. | 715/854 |
| 7,130,616 B2 * | 10/2006 | Janik | 455/412.1 |
| 7,188,320 B1 * | 3/2007 | Landers | 715/850 |
| 7,200,836 B2 * | 4/2007 | Brodersen et al. | 717/100 |
| 7,398,004 B1 * | 7/2008 | Maffezzoni et al. | 386/282 |
| 7,448,021 B1 * | 11/2008 | Lamkin et al. | 717/115 |
| 7,516,472 B2 * | 4/2009 | Danker et al. | 725/87 |
| 7,559,039 B2 * | 7/2009 | Ridgley et al. | 715/854 |
| 7,636,509 B2 * | 12/2009 | Davis | 386/239 |
| 2003/0145331 A1 * | 7/2003 | Escobar et al. | 725/110 |

(Continued)

FOREIGN PATENT DOCUMENTS

| | | | |
|---|---|---|---|
| WO | WO2004064066 A1 | 7/2004 | |
| WO | WO2005036875 A1 | 4/2005 | |

*Primary Examiner* — Ramsey Refai
*Assistant Examiner* — William Titcomb

(57) ABSTRACT

Media content obtained from a content source (11) comprises a plurality of content items (31) which are accessible by an interactive menu structure (60, 65). A preview presentation mode automatically presents a portion of each of a set of the content items (31) to the user in a sequence which represents a navigation path through multiple levels of the menu structure. This shows a user a preview of content items available for presentation without requiring the user to manually navigate various branches of the menu structure. The menu structure can be explored automatically, or a script (33) can specify which items are to be presented. The script (33) can be supplied by the content source (11) or can be obtained from a separate source. During the preview presentation mode information about the current item, or the current position within the menu structure, can be displayed.

23 Claims, 6 Drawing Sheets

(56) References Cited

U.S. PATENT DOCUMENTS

| | | | |
|---|---|---|---|
| 2004/0126085 A1* | 7/2004 | Braun et al. | 386/46 |
| 2005/0089306 A1* | 4/2005 | Green et al. | 386/95 |
| 2005/0268252 A1* | 12/2005 | Parker et al. | 715/810 |
| 2006/0253801 A1* | 11/2006 | Okaro et al. | 715/810 |
| 2007/0074115 A1* | 3/2007 | Patten et al. | 715/716 |
| 2007/0101394 A1* | 5/2007 | Fu et al. | 725/134 |
| 2007/0226650 A1* | 9/2007 | Hintermeister et al. | 715/822 |
| 2007/0250794 A1* | 10/2007 | Miura et al. | 715/810 |
| 2008/0092168 A1* | 4/2008 | Logan et al. | 725/44 |
| 2011/0161923 A1* | 6/2011 | Green | 717/109 |

* cited by examiner

PREVIEW MODE FOR CONTENT

This invention relates to presentation of content obtained from a content source such as an optical disc or an external content provider.

Media content is often packaged in an interactive format which allows a user to select items of content via a visual menu structure that is displayed on the screen of a media player or on an external display connected to the media player. Physical information carriers such as optical discs conforming to the Digital Versatile Disc (DVD) or Blu-Ray formats allow considerable quantities of multimedia material to be stored. An optical disc title carrying a feature film typically carries the feature film and a collection of additional content such as alternative versions of the film, theatrical trailers, deleted scenes, alternative endings, promotional material, cast biographies, quizzes and various other content. The considerable quantity of content is often accessed via a complicated menu structure with many hierarchical levels of menus which is difficult for a user to navigate. A user may experience difficulty knowing what content is available within the whole of an interactive title or in finding a particular item.

A further problem with interactive content titles is that each menu within the hierarchy of the menu structure, and menus between different titles, can differ in their visual presentation style. A menu usually presents a number of possible items for selection and highlights one of the items which can be selected by the user at that time. By operating controls on a user interface a user can vary the highlighted item within the menu and select that item. The presentation style of a highlighted item and the order in which items are highlighted varies between menus, sometimes in a cryptic form, makes it difficult for a user to determine which item is selected.

In a similar manner, media content can be broadcast or streamed to users in an interactive format, with users being able to make selections between available options using on-screen menus.

In view of the above, it will be appreciated that manually exploring each of the options available to a user can be a slow and confusing task.

It is known to provide Compact Disc audio players with a feature known as 'Intro Scan' where the player plays the introductory portion of each audio track on the disc in the linear sequence in which the tracks are stored on the disc. A similar feature has been applied to video cassette recorders (VCR) which index the starting points of recorded programmes on a videotape. The feature plays an introductory portion of each programme in the linear sequence in which the programmes are stored on the videotape. Some DVD players have a Preview function which displays a short introductory portion of tracks found on the disc. However, due to the manner in which DVDs are authored, this can provide the user with an unusual collection of items arranged in a sequence that bears little relation to what a user would experience when navigating the menu structure.

The present invention seeks to provide an improved way of presenting content from a source.

Accordingly, a first aspect of the present invention provides a method of presenting media content obtained from a content source, the content comprising a plurality of content items which are accessible by an interactive menu structure, the method comprising:

presenting content to a user in a preview presentation mode in which a portion of each of a set of the content items is automatically presented to the user in a sequence which represents a navigation path through multiple levels of the menu structure.

The preview presentation mode provides an advantage of showing a user a preview of content items available for presentation without requiring the user to manually navigate various paths of the menu structure. This allows a user to find content that they may otherwise have been unable to discover, and to avoid frustration of repeatedly using interactive menus to find the content items of interest. Because content items are presented in the sequence of a navigation path through the menu structure, the sequence presented to the user has a useful order. This is particularly advantageous since the linear order in which content items are stored on a recording medium will not correspond to the order in which items will appear when viewed using the menu structure.

The menu structure will typically have at least two hierarchical levels of menus. A first (top) level menu will have multiple branches depending from it, with at least one of the branches leading to a second-level menu. Menus at the second (and lower) levels of the menu structure can have further menus or content items depending from them.

Advantageously, a selection menu of the menu structure is displayed before presenting a content item available for selection by that menu. This provides a user with the context of the content item being displayed and illustrates how to find that content item.

Preferably, the preview presentation mode is exited upon receipt of a selection signal from a user. This causes the content item that is currently being previewed to the user to be presented in the normal playback mode for that content item.

Where the menu structure comprises a first-level menu having a plurality of branches depending from it the preview presentation mode preferably proceeds down a first branch of the first-level menu, including any lower-level items or menus depending from that first branch, before returning to a second of the branches of the first-level menu.

Preferably, the preview presentation mode displays a graphical representation of the menu structure and indicates the current position within the structure and/or information about the content item currently being presented.

The preview presentation mode can operate in a manner in which it automatically explores the menu structure. A script, or data accompanying individual content items or menus, can indicate which items or menus are (or are not) to be presented during the preview presentation mode. The script can additionally specify one or more of: the location of the portion to be previewed within the content item; the amount of time that should be spent displaying the content item; the playback mode to be used for the content item. As an alternative to automatically exploring the menu structure, the set of items that are to be presented during the preview presentation mode can be entirely defined in a script. The script can accompany the media content or can be obtained separately from the content.

The method is particularly useful in previewing interactive video applications or multimedia collections of content items, such as video, audio and still images which are packaged in an interactive format, although it is not limited to these.

Further aspects of the invention provide a controller for a client device, such as a media player or terminal, or a server which perform the above method.

The functionality described here can be implemented in software, hardware or a combination of these. The invention can be implemented by means of hardware comprising several distinct elements, and by means of a suitably programmed processing platform. Accordingly, another aspect of the invention provides instructions (software) for causing a processor to implement the method. The instructions may be stored on an electronic memory device, hard disk, optical disk or other machine-readable storage medium. The software may be downloaded directly to a client device via a network connection and can be provided as an upgrade to a client device already in service.

A further aspect of the invention provides a record carrier carrying a plurality of media content items and navigation data defining an interactive menu structure by which the content items are accessible, the record carrier further comprising script data which specifies to a media player a set of the content items that should be shown during a preview presentation mode in which a portion of each of a set of the content items is presented to the user in a sequence which represents a navigation path through multiple levels of the menu structure.

Embodiments of the present invention will now be described, by way of example only, with reference to the accompanying drawings, in which:—

Figure 1:
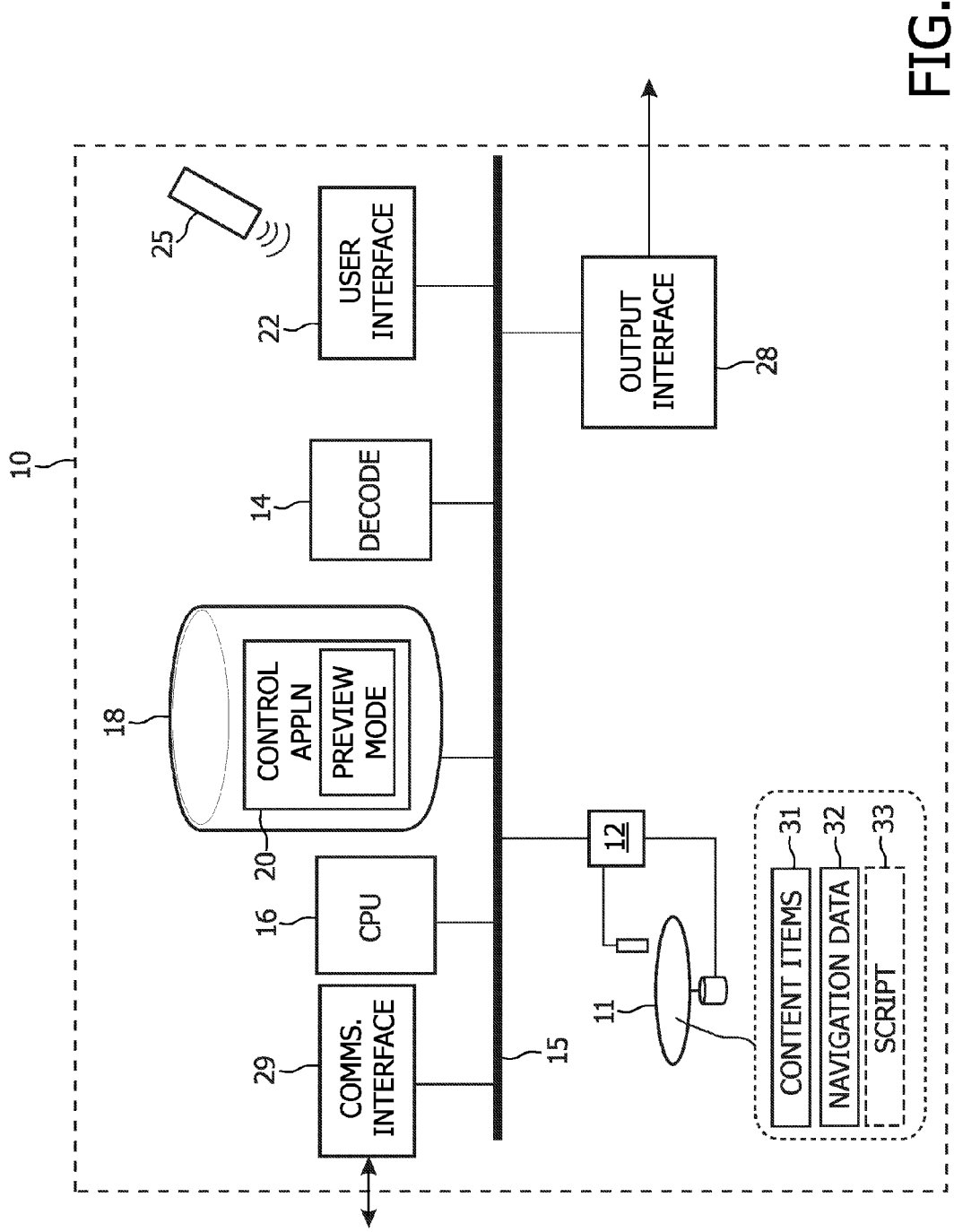
FIG. 1 shows a media player embodying the invention.

FIG. 1 schematically shows a media player 10 which embodies the present invention. In this embodiment the media player is an optical disc player, such as a player which is capable of playing discs 11 conforming to the Digital Versatile Disc (DVD) or Blu-Ray formats. A transport mechanism 12, which includes a drive and a read head, retrieves data from an optical disc 11 that a user wishes to view and applies retrieved data to a decoding function 14. Decoding function 14 applies error correction/detection to retrieved data and demultiplexes the data into audio, video and control data streams. A processor (central processing unit CPU) 16 executes a control application 20 which resides in a memory 18. In this embodiment the control application 20 and processor 18 form a controller for the media player 10. However, it will be appreciated that the controller can be implemented entirely in hardware as an Application Specific Integrated Circuit (ASIC), a programmable array or other logic circuit. The CPU 16 and memory 18 are operatively connected via a bus 15 that also operatively interconnects other components of the player. An output interface 28 converts audio and video data into a suitable format for presentation by a display and an audio system; this can include generating an analogue video signal (in component or composite format) and analogue or digital audio outputs, or an entirely digital output signal such as one conforming to the High-Definition Multimedia Interface (HDMI) specification.

User interface 22 includes a set of controls which allow a user to provide control inputs to the player 10. The controls can take the form of an operating panel mounted on the media player 10 or a remote control 25. The remote control can have a graphical user interface (GUI) or preferably the user interface uses a video overlay to display user selectable options on a display connected to the output interface 28 of the media player 10. User interface 22 and control application 20 provide a set of user-selectable functions which allow a user to navigate through the content stored on a disc. The functions include play, pause, skip forward/back and repeat.

While it is possible for a DVD to have a single content item it is conventional, particularly for published or professionally authored titles, for the DVD to be arranged as a collection of content items 31 which are accessed via an interactive menu structure. A file of navigation data can specify the entire menu structure of the content items 31 or the structure can be defined by individual menus, each holding navigation data in the form of links to other menus and content items 31 in a similar manner to hypertext linking between web pages.

On first loading a disc, and after any initial announcements such as copyright notices or advertisements, a top level menu is displayed. In the DVD format each menu is itself a short movie, which displays a set of user-selectable icons. On first presenting a menu, one of the icons is highlighted to indicate that it is available for selection. User interface 22 has a set of arrow keys which allow a user to change the highlighted icon and a selection button to select a highlighted icon. Selecting an icon can cause a content item on the disc to be directly played, or may cause a further menu of options to be displayed. All of the above will be well understood by a skilled person.

The features of the control application 20 relevant to the present invention will now be described. User interface 22 and the control application are modified to include a feature which allows the user to select an additional playback mode which will be called a preview mode. The preview mode can be set by an individual 'preview mode' control on the user interface 22, such as a new button on remote control 25, or by adding a further option to one of the player's control menus. The preview mode automatically follows all navigational branches on the title and shows a short introductory portion of the target of the branch, before moving onto the next target. The preview mode can be cancelled at any time by pressing the 'preview mode' control again.

Figure 2:
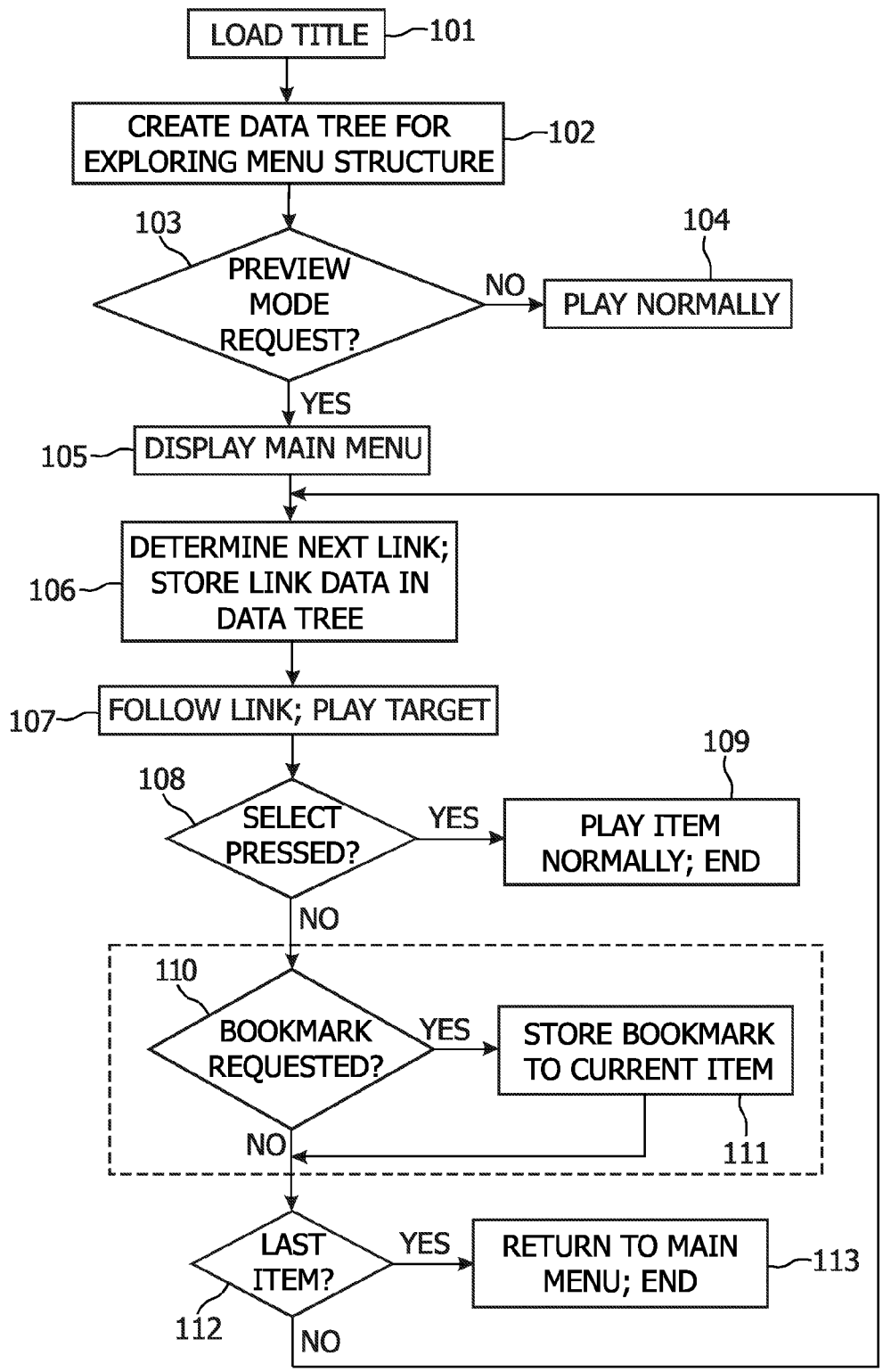
FIG. 2 shows a flow diagram of a first embodiment of a preview mode.

FIG. 2 shows a first embodiment of the preview mode which follows the menu structure of the title. This can be used with legacy titles, such as DVDs, which are not modified to carry any additional data to support this feature. At step 101 the title is loaded by the player. Player 10 retrieves various data about the type of disc and navigation data to begin playing the disc. This may cause the player to present some initial announcements, such as copyright notices or advertisements, or to directly display a top level menu for the title. At step 102 the player creates a data tree which will be used to explore the menu structure and retrieves any navigation data about the menu structure that is currently available. This data tree will be used if a player decides to use preview mode. At this stage the player may be able to access a full set of navigation data specifying menus and links between menus and items stored on the disc. Alternatively, the source may only provide navigation data for the main menu at this stage.

At step 103 the player determines whether a user requests the player to enter the preview mode. For simplicity, step 103 is shown directly after loading the title but the user may enter the preview mode at any time after the title is loaded, such as while the main menu is playing or while the user is watching one of the content items on the disc. If the preview mode is not requested the player enters (or remains in) a normal playback mode at step 104. If the preview mode is requested then the player begins to explore the menu structure and to play a preview of each item in the menu structure. At step 105 the main menu is displayed. The player then determines the first link to follow at step 106. On the first occasion this is the first link from the main menu. A link from the main menu points to a target item, which can be a content item or another menu with a further set of links. The link is followed and the target item (a content item or menu) is displayed at step 107. If the target item is a content item the player plays an introductory portion of the content item for a short period, e.g. 10 seconds, in the normal presentation mode of that item. If a 'play' or 'select/enter' key is pressed while the video item is playing (step 108) the preview mode is exited and the video item is played normally at step 109. After a short period, which can be preset or user-defined, the player proceeds to the next menu item. A check at step 112 determines if there are any further menu items. If there are no further menu items the preview mode ends and the main menu is displayed at step 113. If there are further menu items, the preview mode continues by returning to step 106. It is assumed that the player does not have information about the full menu structure when beginning preview mode. Generally, each time a new menu is discovered in the menu structure details about that menu, and all links depending from it, are added to the data tree created at step 102. This data tree is updated as the method follows each link to a target item. This stored link data allows the method to systematically explore the menu structure and to determine whether there are any unexplored links remaining in the menu structure.

Figure 3:
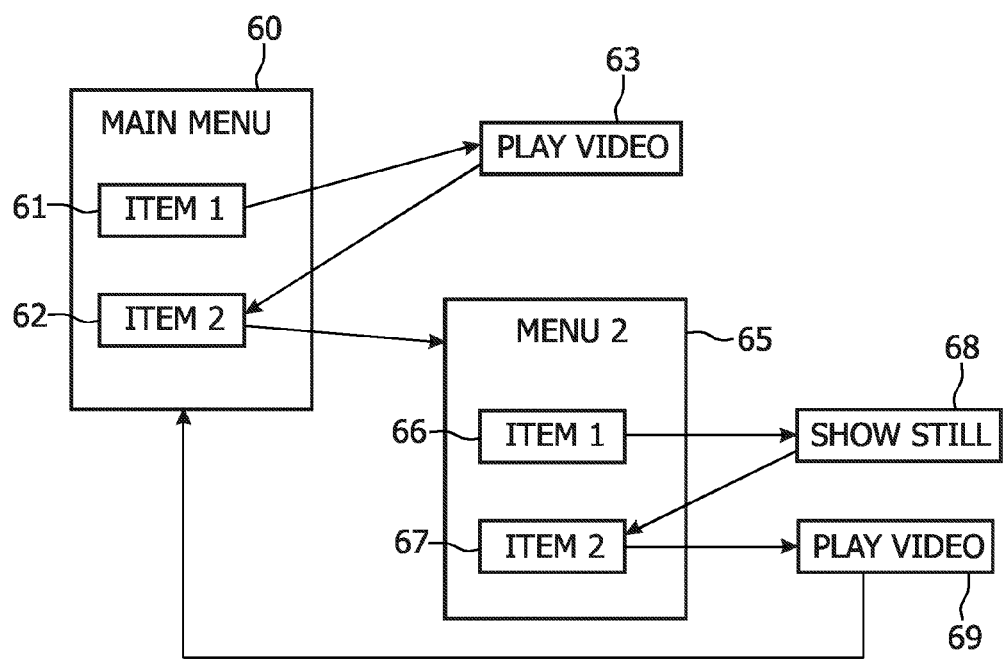
FIG. 3 shows an example menu structure being explored during preview mode.
Figure 4:
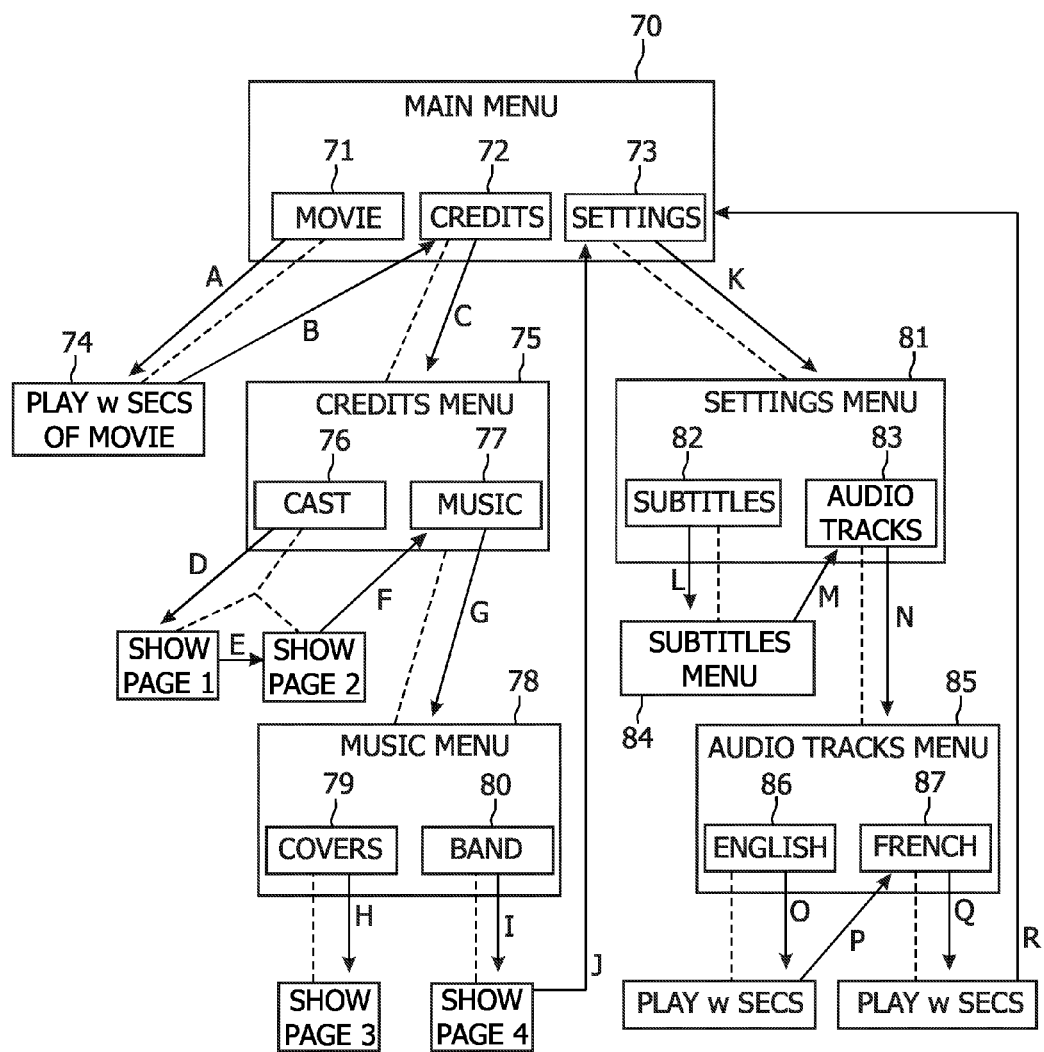
FIG. 4 shows another example menu structure being explored during preview mode.

To illustrate the invention, FIGS. 3 and 4 show two example menu structures. Firstly, FIG. 3 shows an example of a simple menu structure that can be found on a disc. The menu structure has a main (top-level) menu 60 with two links 61, 62. Link 61 is directly to a video clip (such as a feature film) and link 62 is to a second-level menu 65. Second-level menu 65 has two links: a first link 66 to a still image 68 and a second link 67 to a video clip 69. The set of arrows in FIG. 3 show the sequence in which the menu structure is explored during preview mode. After displaying the main menu 60 the first link 61 is followed to video clip 63. An introductory portion of video clip 63 is played. As there are no further links depending from item 63, the preview mode returns to the main menu 60 and selects the second link 62 on the main menu 60. This displays the second-level menu 65. The preview mode proceeds to explore each link 66, 67 in turn. Link 66 is to a still image 68, which is displayed for a short period. Returning to second-level menu 65, the second link 67 is to a video clip 69. An introductory portion of the video clip 69 is played. As item 69 is the target in the menu structure, and there are no further menu links remaining, the preview mode returns to display the main menu 60 and ends.

FIG. 4 shows a more detailed menu structure. The menu structure has a main (top-level) menu 70 with three links 71, 72, 73. Link 71 is directly to a video clip (the main feature film) and link 72 is to a second-level menu 75. Menu 75 has links 76, 77 to further items. Link 77 links to a third-level menu 78. The set of arrows labelled A-R show the sequence in which the menu structure is explored during preview mode. After displaying the main menu 70 the first link 71 is followed to video clip 74 and an introductory portion of the video clip 74 is played. As there are no further links depending from item 74, the preview mode returns to the main menu 70. From the data tree the player knows that a second, unexplored, link 72 exists and selects the second link 72 on the main menu 70 and proceeds to explore this link in steps C-I. Following link 72 causes the player to display the second-level menu 75. As this menu has not previously been visited the details of all possible links are stored in the data tree at step 106 of FIG. 2. The preview mode proceeds to explore each link 76, 77 in turn. Link 76 is followed to two still image pages which are each displayed in turn for a short period. Returning to second-level menu 75, using the data tree the player knows that a second, unexplored, link 77 exists from menu 75. Link 77 is followed to a further menu 78 with two possible links 79, 80. As menu 78 has not previously been visited the details of this menu and links 79, 80 are stored at step 106 of FIG. 2. Link 79 is followed to a still image page which is displayed for a short period. Returning to menu 78, using the data tree the player knows that a second, unexplored, link 80 exists from menu 78. Link 79 is followed to a still image page, which is displayed for a short period. The data tree tells the player that no further unexplored links exist at menus 78 or 75. The player returns to the main menu 70 at step J. The player determines that it still has a third link 73 to explore. Menus 81 and 85 depending from link 73 are explored at steps K-Q in the same manner as just described. When all links from menus 81, 85 have been explored, the player returns to the main menu. The player knows that there are no further unexplored links from menu 70 and so preview mode ends.

Figure 5:
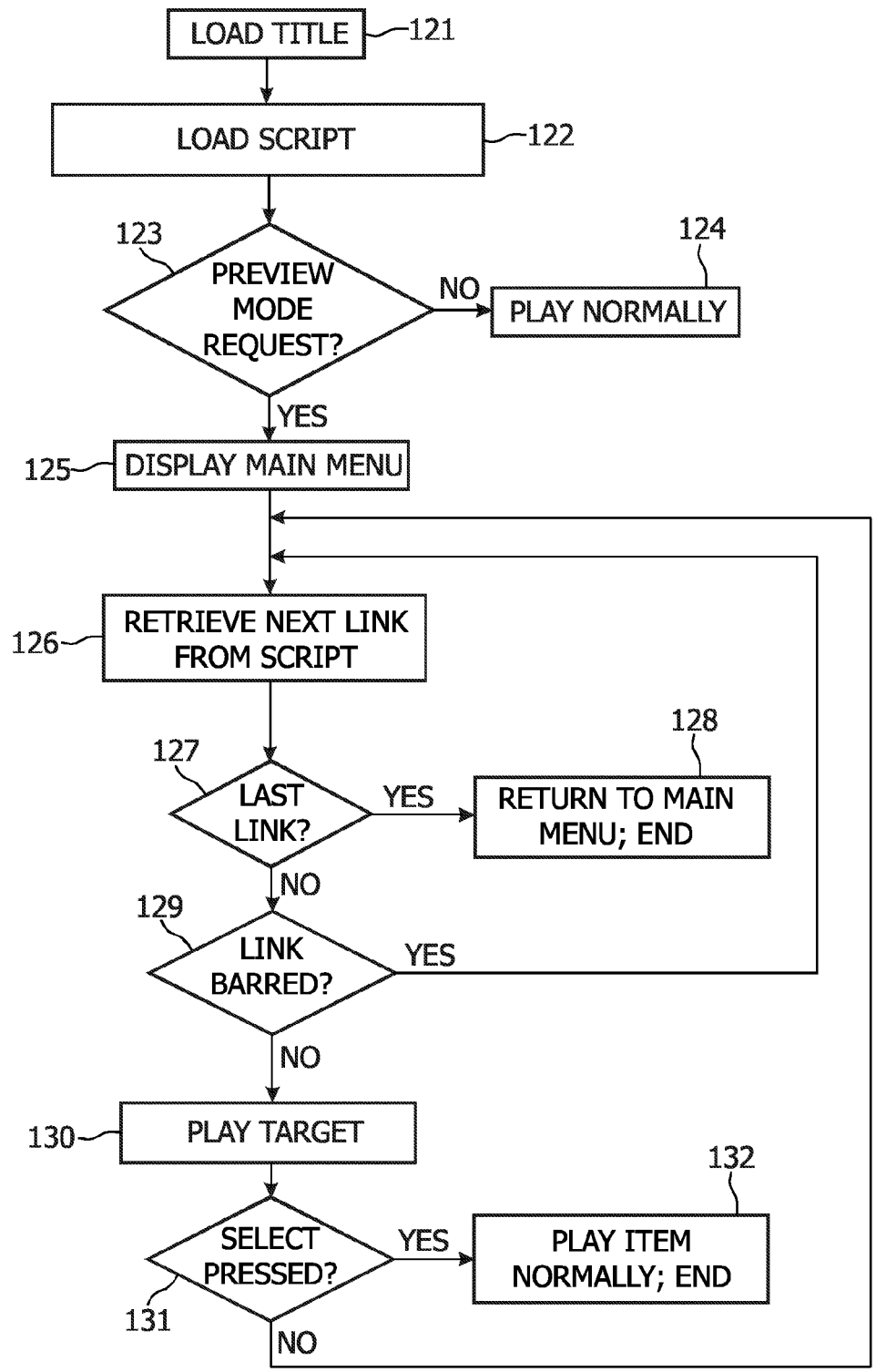
FIG. 5 shows a flow diagram of another embodiment of a preview mode.

FIG. 5 shows a second embodiment of the preview mode where a script determines what is displayed during preview mode. The script can be supplied with the content, as an additional data item on the disc 11, or can be obtained from a separate source to the content, such as an Internet server which is accessible by a communications interface 29. This embodiment can be used, for example, with optical discs carrying a script or with legacy discs where a script is obtained from a network source, such as the manufacturer or distributor of the disc. The script can be created at a later date than the title to which it relates.

At step 121 the title is loaded by the player. Player 10 retrieves various data about the type of disc and navigation data to begin playing the disc. At step 122 the player retrieves the script which determines what content items will be shown during preview mode. Although it is possible to perform this step after step 123, i.e. the script is only loaded if a user requests preview mode, it can be more efficient to load the script while other processes are occurring. At step 123 the player determines whether a user requests the player to enter the preview mode. As described previously, the user may enter preview mode at any time after the title is loaded, such as while the main menu is playing or while the user is watching one of the content items on the disc. If preview mode is not requested the player enters (or remains in) a normal playback mode at step 124. If preview mode is requested at step 123 the player displays the main menu at step 125 and then begins to follow the set of links specified in the script. A first link is retrieved at step 126 and the item pointed to by that link is displayed at step 130. An author of a content title may choose to bar certain links from being followed. A check is made at step 129 whether the link specified in the script is barred for that title. If it is barred, the link is not followed and the method proceeds to retrieve the next link at step 126. When all of the links in the script have been followed, this is detected at step 127 and the preview mode ends at step 128. Preferably, this causes the player to display the main menu. As in the embodiment shown in FIG. 2, pressing the 'play' or 'select/enter' keys at step 131 causes the player to play the current item normally and the preview mode to end at step 132.

The preview mode can additionally present a preview of chapters of a content item located within the menu structure, such as chapters of a movie, rather than just the beginning of a content item. This is especially useful for titles having a simple menu structure which lacks a menu allowing the user to select a particular chapter. It is preferable that the script specifies which items are to be previewed in this depth, to avoid an unnecessarily long preview of the disc contents.

The script can specify which menu links are shown during preview mode. Additionally, the script can specify, for each item:
- the amount of time that should be spent displaying the item;
- the playback mode to be used for an item (e.g. for a video item with audio the playback mode can be chosen from: normal; still frame; video without audio);
- the particular portion of the content item that should be displayed (i.e. not necessarily the introductory portion but a more representative portion of the item, such as the video occurring between the elapsed times of 1 min 20 secs and 1 min 30 secs into the item). This can also be useful with menus that feature a long introductory video portion before displaying links available for selection by that menu, and can be used to skip to the point where the links are displayed.

The author of the script can intelligently select the parameters of the script to ensure the preview mode is useful to a user of the title. A number of different scripts can be provided depending on a user's preferences. The script can define a preview which is tailored to the age of the user. As an example, a title which is rated for viewing by adults (certificate 18) could have a first script which is rated certificate 18 and a second script which is rated for a younger age group (e.g. certificate 12). Scripts can be provided which concentrate on particular aspects of the title, such as the main feature and options for viewing the main feature (sound, language).

In the example described above, the script specifies each link to be followed. As an alternative, the script can simply define which links should not be followed. In this case, preview mode operates as shown in FIG. 2, following the menu structure as laid out on the disc, but avoids the links specified as 'barred links' in the script.

In a further alternative the method operates as shown in FIG. 2 but the title incorporates information that blocks a particular link from being followed during preview mode. This requires the individual content items to carry information which will prevent them being presented, or for the link data on that disc to notify the preview mode that the link should not be followed.

A user can set preferences to indicate the way that preview mode should operate. This is particularly useful where preview mode operates in the manner of FIG. 2. These preferences can include: specifying duration of the preview period for each item (e.g. play menus in full, play video targets for a longer period than menus); the lowest menu level to be shown; what content items are shown (e.g. only video clips and not still images). These parameters can be specified via control menus. In following the preview method shown in the flow diagrams of FIGS. 2 and 5 the controller uses the parameters set by the user.

Figure 6:
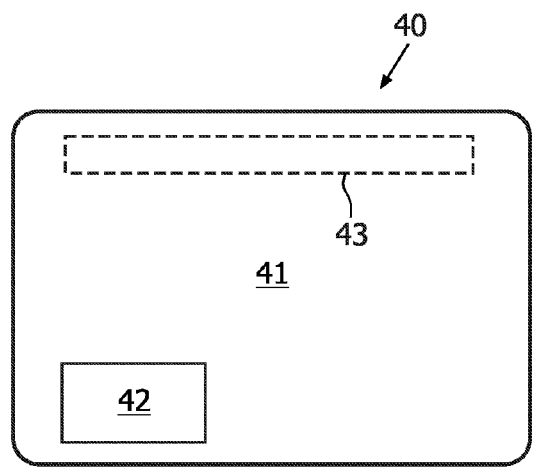
FIG. 6 shows a screen display during preview mode.
Figure 7:
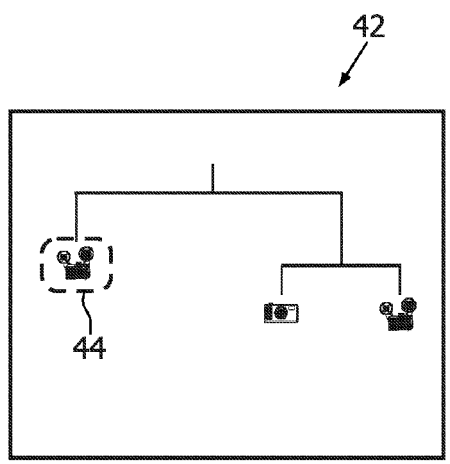
FIG. 7 shows a tree-diagram showing the current position within the menu structure which forms part of the screen display of FIG. 6.

In a basic form the preview mode simply displays a sequence of content items relating to the links of the menu structure. However, it is preferable that the preview mode helps the user to understand the context of the items being shown. When displaying a selection menu, the menu link which is about to be followed is highlighted before following the link, to indicate the context of the item (or further menu) that is about to be shown to the user. Alternatively, or additionally, information is displayed simultaneously with the preview of the content item to help a user understand what they are currently viewing, and where the current item is positioned within the overall menu structure. FIG. 6 shows an example of a screen display 40 that can be output by the player 10 during preview mode. The main area 41 of the screen is used to display a preview of the current content item. A banner overlay, shown as window 43, displays text which describes the content currently being previewed, such as "Feature film", "Alternative Ending #1", "Cast Bio #5". This information can be derived from meta-data accompanying the content item. Additional information can indicate the total duration of the content item, content type etc. A reduced size picture-in-picture 42 displays a tree-diagram of the menu structure and the current position within that menu structure. This is shown in more detail in FIG. 7. The menu structure shown in FIG. 7 is the same as used in the example of FIG. 3. The menu structure is shown as a tree-diagram with icons indicating the type of content of each content target item. In this case, the icons represent a video clip and still image and distinctive icons can similarly be used for other content types such as audio tracks. Alternatively, textual titles can be used for the menus and items, depending on the amount of information to be presented in the tree diagram. The current position within the menu structure is indicated in a readily-identifiable manner, such as by displaying the icon in a different colour, in a flashing manner, or other style.

Referring to FIG. 3, where multiple content items depend from a common menu (see for example content items 68, 69 and menu 65) the preview mode can display one content item directly after another, e.g. show still 68 and then directly play video 69 or it can display menu 65 in between showing items 68, 69. Where additional information is provided to a user indicating their position within the menu structure, such as a tree diagram or textual overlay, it is advantageous to not repeatedly show the same menu between each content item to reduce the overall length of the preview mode.

While performing preview mode, a user may see a content item which they would like to view in full. The user has the option to exit preview mode and watch an item in full by pressing 'play' or 'select/enter'. In a further enhancement, preview mode has an added feature of allowing a user to set a bookmark to one or more content items that they view during preview mode. These bookmarks are stored in a memory as a Bookmark Playlist for the title, so it is easier for the user to return to their favourite part of the title at a later time. Referring again to FIG. 2, a step 111 determines whether a user requests a bookmark to be stored. If so, a bookmark is stored to the current item at step 112. These bookmarks can be retained for the current viewing session or, optionally, can be stored for a future occasion that the user loads the same disc into the player 10. Bookmarks can be stored in a bookmark menu which is accessible via the user interface 22, 25. A user can return to a bookmarked item by selecting the bookmark menu, highlighting the particular bookmark of interest within that menu and pressing 'enter/select' on the remote control 25.

While the above embodiment shows an optical disc player, the invention can be applied to a range of other media content players and consumer electronics devices. The player can use hard disk storage, such as a Personal Video Recorder (PVR) or media server, or solid state memory which is fixed or removable from the player for storing the content. Media content can be downloaded to the device from an external provider via a network connection. With the above types of device all of the content that is to be navigated during preview mode is usually stored locally at the device.

The invention can also be applied to terminals which receive an interactive application or service, with content being broadcast or streamed to the terminal from an external content provider. In this situation only part of the total collection of content items and the menu structure may be available locally to the terminal (client-side) at any time. It will be assumed that a terminal accesses content which has the same menu structure as previously shown in FIG. 3. Initially the terminal may receive data to display main menu 60. Selecting link 61 can cause video clip 63 to be streamed to the terminal, by exchanging signalling between terminal and the content provider requesting the streaming of clip 63. Alternatively, the clip 63 may be readily available in the broadcast multiplex, and clip 63 is accessed by the terminal. Selecting link 62 causes menu 65 to be displayed. Certain content items, such as still 68, may be downloaded to the terminal at the same time as the menu and can therefore be previewed without requiring further content to be downloaded from the content provider. Other content items, such as video clips or lower-level menus can be requested as needed and will be downloaded or streamed to the terminal, or accessed by the terminal, on demand, to be displayed during preview mode. Signalling flows between the client terminal and content provider allows the client terminal to determine what content is available, and to request a preview of a next content item. On an optical disc content items are referenced by sector addresses where the items can be found on the disc. In the case of content items accessed over a network connection, the content items are referenced by network addresses, such as a Uniform Resource Locator (URL), or by an address which identifies the item within the broadcast multiplex.

Where content is stored at a remote content server, there is an alternative manner in which preview mode can be implemented. The content server can control what is delivered to the terminal during the preview mode. Rather than control logic at the terminal navigating the menu structure and requesting a preview of each content item, the terminal sends an initial 'enter preview mode' request to the server. Subsequently, the server begins to deliver a sequence of screen displays of menus and previews of content items that are available by selecting each menu item. The preview mode can be cancelled, or an item selected, by a user at any time. Upon cancelling preview mode the terminal instructs the server to 'end preview mode'.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim. Where the system/device/apparatus claims recite several means, several of these means can be embodied by one and the same item of hardware.

In the description above, and with reference to the Figures, media content obtained from a content source 11 comprises a plurality of content items 31 which are accessible by an interactive menu structure 60, 65. A preview presentation mode automatically presents a portion of each of a set of the content items 31 to the user in a sequence which represents a navigation path through multiple levels of the menu structure. This shows a user a preview of content items available for presentation without requiring the user to manually navigate various branches of the menu structure. The menu structure can be explored automatically, or a script 33 can specify which items are to be presented. The script 33 can be supplied by the content source 11 or can be obtained from a separate source. During the preview presentation mode information about the current item, or the current position within the menu structure, can be displayed.

The invention claimed is:

1. A method of presenting media content of a media title obtained from a content source, the content comprising a plurality of content items which are accessible by an interactive menu structure, the method comprising:
presenting content, via a display, to a user in a preview presentation mode in which a portion of each of a set of the content items available for presentation relating to a target of a branch of the menu structure is automatically presented to the user for all possible links of a corresponding branch before moving onto a next branch of the menu structure in a sequence of the content items relating to links of the menu structure without requiring the user to manually navigate various paths'of the menu structure while in the preview presentation mode, wherein the target comprises (i) a content item and (ii) another menu with a further set of links, wherein the sequence further comprises a navigation path that the preview presentation mode follows through all navigational branches of multiple levels of the menu structure for automatically exploring the menu structure one branch at a time, wherein the preview presentation mode further comprises (a) indicating a context of (a)(i) the content item and (a)(ii) the another menu that is about to be presented to the user when displaying a selection menu of links by highlighting a menu link which is about to be followed before following the corresponding menu link, and (b) displaying simultaneously with preview of a content item (b)(i) information about the content item currently being previewed and (b)(ii) a corresponding position of the content item currently being previewed within a tree-diagram of the menu structure.

2. The method according to claim 1 wherein the menu structure comprises a first-level menu having a plurality of branches depending from it and wherein the preview presentation mode proceeds down a first branch of the first-level menu, including any lower-level items or menus depending from that first branch, before returning to a second of the branches of the first-level menu.

3. The method according to claim 1 wherein the preview presentation mode displays a selection menu of the menu structure before presenting a content item available for selection by that menu.

4. The method according to claim 1 wherein the preview presentation mode presents an introductory portion of each of the set of content items.

5. The method according to claim 1 wherein the preview presentation mode presents a portion of each of the set of content items in a normal playback mode for those items.

6. The method according to claim 1 wherein the preview presentation mode graphically presents information about the content item currently being previewed.

7. The method according to claim 1 wherein the preview presentation mode displays a graphical representation of the menu structure and indicates the current position within the structure.

8. The method according to claim 1 wherein the length of the portion of the content item that is presented during the preview presentation mode is user-selectable.

9. The method according to claim 1 wherein the content can comprise a plurality of different content types and content types displayed during the preview presentation mode are user-selectable.

10. The method according to claim 1 wherein the lowest level of the menu structure that is presented during the preview presentation mode is user-selectable.

11. The method according to claim 1 further comprising exiting the preview presentation mode upon receipt of a selection signal and presenting a content item which is currently being previewed to the user in a normal playback mode for that content item.

12. The method according to claim 1 further comprising, during the preview presentation mode, receiving a user input signal and storing an identity of the content item being presented at that time.

13. The method according to claim 1 wherein the set of content items is defined by a script which accompanies the content.

14. The method according to claim 1 wherein the set of content items is defined by a script which is obtained separately from the content.

15. The method according to claim 13 wherein the script specifies a location within the content item of the portion to be previewed.

16. A controller for a client device or server comprising control logic which is operable to perform the method according to claim 1.

17. A client device incorporating a controller according to claim 16.

18. The client device according to claim 17, further comprising a transport mechanism for reading an optical disc which carries the media content and a user interface for receiving user instructions.

19. The client device according to claim 17 further comprising a network interface for communicating with a network server.

20. A network server for delivering content to client devices comprising:
a store of media content of a media title, the media content of the media title comprising content items which are arranged in an interactive menu structure; and,
a controller which is operable to:
receive a signal from the client device indicating that the server should enter a preview presentation mode; and,
automatically present, via a display, a portion of each of a set of the content items available for presentation relating to a target of a branch of the menu structure to the user for all possible links of a corresponding branch before moving onto a next branch of the menu structure in a sequence of the content items relating to links of the menu structure without requiring the user to manually navigate various paths of the menu structure while in the preview presentation mode, wherein the target comprises (i) a content item and (ii) another menu with a further set of links, wherein the sequence further comprises a navigation path that the preview presentation mode follows through all navigational branches of multiple levels of the menu structure for automatically exploring the menu structure one branch at a time, wherein the preview presentation mode further comprises (a) indicating a context of (a)(i) the content item and (a)(ii) the another menu that is about to be presented to the user when displaying a selection menu of links by highlighting a menu link which is about to be followed before following the corresponding menu link, and (b) displaying simultaneously with preview of a content item (b)(i) information about the content item currently being previewed and (b)(ii) a corresponding position of the content item currently being previewed within a tree-diagram of the menu structure.

21. A non-transitory computer-readable medium embodied with instructions for causing a processor to perform the method of claim 1.

22. A non-transitory record carrier embodied with a plurality of media content items of a media title and navigation data defining an interactive menu structure by which the content items of the media title are accessible, the record carrier further embodied with script data for execution by a processor of a media player for causing the media player to perform in a preview presentation mode, wherein the script data specifies to the media player a set of the content items that should be shown, via a display, during the preview presentation mode in which a portion of each of a set of the content items available for presentation relating to a target of a branch of the menu structure is automatically presented to the user for all possible links of a corresponding branch before moving onto a next branch of the menu structure in a sequence of the content items relating to links of the menu structure without requiring the user to manually navigate various paths of the menu structure while in the preview presentation mode, wherein the target comprises (i) a content item and (ii) another menu with a further set of links, wherein the sequence further comprises a navigation path that the preview presentation mode follows through all navigational branches of multiple levels of the menu structure for automatically exploring the menu structure one branch at a time, wherein the preview presentation mode further comprises (a) indicating a context of (a)(i) the content item and (a)(ii) the another menu that is about to be presented to the user when displaying a selection menu of links by highlighting a menu link which is about to be followed before following the corresponding menu link, and (b) displaying simultaneously with preview of a content item (b)(i) information about the content item currently being previewed and (b)(ii) a corresponding position of the content item currently being previewed within a tree-diagram of the menu structure.

23. The non-transitory record carrier according to claim 22 wherein the script data further specifies one or more of the following for a content item:
the amount of time that should be spent displaying the content item; the playback mode to be used for the content item; the particular portion of the content item that should be displayed.

* * * * *